May 21, 1929. E. E. SLICK 1,714,193
VASE FOR FLOWERS AND THE LIKE
Filed Sept. 30, 1925
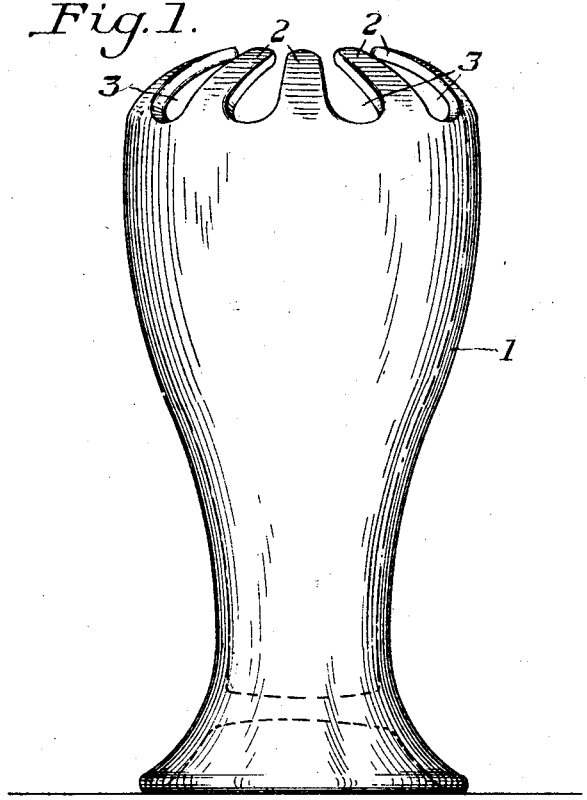
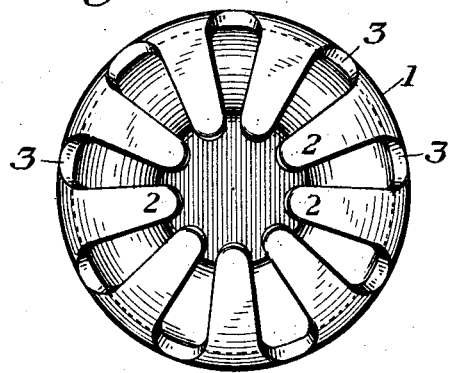
INVENTOR Patented May 21, 1929.

1,714,193

UNITED STATES PATENT OFFICE.

EDWIN E. SLICK, OF PITTSBURGH, PENNSYLVANIA.

VASE FOR FLOWERS AND THE LIKE.

Application filed September 30, 1925. Serial No. 59,733.

The present invention relates to vases for holding flowers or like things, such as ferns, foliage, etc. The object of the invention is to form the vase so as to hold the stems of the flowers separated to form a symmetrical bouquet.

In the drawings:

Figure 1 is an elevation; and

Figure 2 is a plan view of a vase embodying my invention.

Referring to the drawings, the body 1 of the vase may be of any suitable or usual form, but has preferably, as shown, a rather deep body to form a tall type of vase to receive the stems of the flowers or ferns, or other things to be held. The brim of the vase is formed with a number of rounded inwardly bent fingers 2, as shown, there being flower stem receiving openings 3 between the fingers which merge into a central opening of relatively small diameter when compared with the diameter of the top of the vase, and which serve to separate the stems of the flowers and hold them in the desired position, the stems of the flowers projecting through the recesses or openings 3. The vase may be of any suitable material, such as glass, and the bent over fingers 2 are formed integral with the body of the vase.

It is to be understood that the invention is not limited to its illustrated embodiment, but may be otherwise embodied within the scope of the following claim.

I claim:

A hollow vase for holding flowers having a body, a closed bottom, and a top formed of a plurality of spaced upwardly and inwardly curved fingers, there being flower stem receiving openings between said fingers, which openings merge into a central opening of relatively small diameter when compared with the diameter of the top of the vase, the outer surfaces of the fingers merging into the outer surface of the body of the vase and forming a continuation thereof.

In testimony whereof I have hereunto set my hand.

EDWIN E. SLICK.